United States Patent Office 3,342,143
Patented Sept. 19, 1967

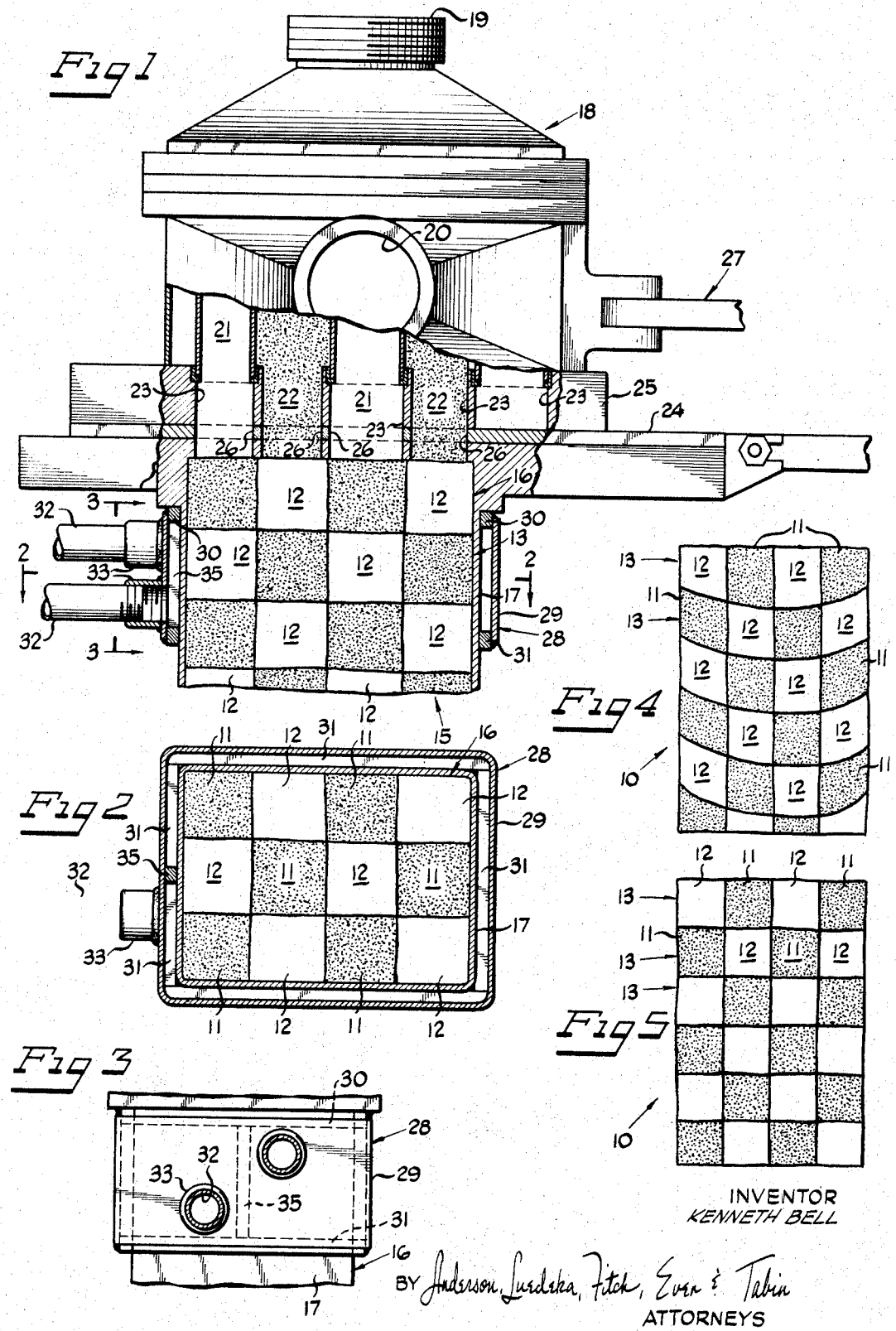

3,342,143
METHOD AND APPARATUS FOR FORMING AN EDIBLE PRODUCT
Kenneth Bell, Marengo, Ill., assignor to National Dairy Products Corporation, New York, N.Y., a corporation of Delaware
Filed Sept. 2, 1965, Ser. No. 484,646
6 Claims. (Cl. 107—1)

This invention relates generally to the formation of an edible product of two or more materials and, more particularly, to the formation of a product of sections of the different materials arranged in transverse layers in a column which is advanced lengthwise into a container. During such advance, the column is confined in a tube and the center portion of each layer tends to advance ahead of the peripheral portion so that the layers and the patterns in the respective layers are distorted in the finished product.

The primary object of the present invention is to provide a novel method and apparatus for forming the completed product without distortion of the layers or the patterns of the sections within the layers.

Another object is to reduce the friction between the tube wall and the column in a novel manner so that the central and peripheral portions of each layer tend to travel along the tube at the same speed.

A further object is to reduce the friction and achieve a uniform speed of travel of each part of each layer along the tube by providing a layer of lubricating material between the column and the tube wall.

A more detailed object in the case where the product contains at least one material adapted to become more liquid upon the application of heat, is to take advantage of such property of the material in a novel manner to form the lubricating layer between the column and the tube wall.

Other objects and advantages of the invention will become apparent from the following detailed description taken in consideration with the accompanying drawings, in which:

FIGURE 1 is a fragmentary side elevational view of apparatus embodying the present invention, some of the parts being broken away and shown in section along a central vertical plane.

FIGURE 2 is a sectional view taken along the line 2—2 of FIGURE 1.

FIGURE 3 is a sectional view taken along the line 3—3 of FIGURE 1.

FIGURE 4 is an elevational view of a product formed respectively without embodying the method and apparatus of the invention.

FIGURE 5 is a view similar to FIGURE 4 showing a product formed with the new method and apparatus.

The present invention is especially suited for the formation of an edible product 10 having sections 11 and 12 of two or more materials arranged in patterns in layers 13 extending transversely of a longitudinal axis of the product. The product shown in the drawings for purposes of illustration is an elongated rectangular block with two materials in cubic sections, the cubes of one material being shown as plain and those of the other being dotted or speckled. Within each layer, the different cubes are arranged in a checkerboard pattern. The patterns of adjacent layers are reversed relative to each other so that adjacent sections of adjacent layers as well as adjacent sections of each layer are formed of different materials.

The improved method and apparatus are particularly adapted for forming an ice cream product of different flavors or colors. However, they also may be employed with other edible materials which are plastic or extrudable and have sufficient viscosity to retain their shape until deposited in a container 14. Examples of such other materials are sherbets, ices, dough, puddings, peanut butter, cream cheese and shortenings such as butter and margarine.

In general, the invention contemplates forming the sections in patterns in transverse layers in a column 15. The column then is advanced lengthwise and into the container 14. During such advance the column is confined within a tube or passageway 16 defined by a wall 17 complementary in cross-sectional size and shape to the periphery of the column and telescoping within the container. To avoid distortion of each layer 13 and of the pattern of sections 11 and 12 within the layer, the tube wall is treated so as to reduce the friction between the wall and the column periphery and thus, the tendency of the central portion of each layer to travel ahead of its periphery as shown in FIGURE 4. More specifically, this treatment is introducing a layer of lubricating material between the column and tube wall. In the case where at least one of the materials is of the type which tends to become more liquid in response to the application of heat, the lubricating layer is formed simply and easily by heating at least a portion of the tube wall.

In the present instance, the column 15 of layers 13 of sections 11 and 12 in their checkerboard patterns is formed in apparatus like that shown in co-pending application Ser. No. 337,991, filed Jan. 13, 1964, now Patent No. 3,295,466. This apparatus comprises a housing 18 having inlet ports 19 and 20 communicating with individual separated chambers 21 and 22 located within the housing and each adapted to receive a different flavor of ice cream under pressure through the associated inlet port. Square outlet openings 23 from the chambers lie in a common plane and alternate with each other in perpendicular rows to form a checkerboard arrangement. The housing is supported for horizontal reciprocation between limit positions on a stationary horizontal plate 24 and is guided in such movement by stationary guides 25.

The stationary plate 24 is formed with square holes 26 arranged in the same number of rows as the housing openings 23 longitudinally of the direction of reciprocation of the housing 18 but are less than the number of rows in the transverse direction. In one of its two end positions, for example, to the right as viewed in FIGURE 1, the left four transverse rows of housing openings register with the plate holes and the rightmost transverse row of housing openings is blocked by the plate. In the other limit position of the housing, the leftmost transverse row of its openings is blocked by the plate and the rightmost four rows of housing openings register with the plate holes.

A suitable power actuator (not shown) reciprocates the housing, through a link connection 27. The rate of reciprocation is correlated with the rate of flow of ice cream through the housing openings so that, after sufficient flow of ice cream into the plate holes 26 to form one layer 13 in the column 16 with the housing in one limit position, the housing is shifted to its other limit position and, after flow of the same amount of ice cream is returned to its initial position. With repeated alternate positioning of the housing in this manner, the column is formed with the sections 11 and 12 of different ice creams in the checkerboard patterns in the layers.

From the holes 26 in the stationary plate 24, the pressure of ice cream in the housing chambers 21 and 22 advances the column 15 into the tube 16 whose wall 17 is secured to and depends vertically from the plate. To complement the rectangular shape of the column, the interior of the tubular wall is similarly of rectangular cross section, the interior surfaces of the tube wall being closely adjacent to the outer edges of the outer ones of the plate holes 26.

The apparatus for introducing a layer of lubricating material in this instance treats the tube wall 17 by heating it and therefore is adapted for use where at least one of the materials is similar to ice cream in tending to become more liquid upon the application of heat. Upon the application of heat to the wall, such heat is transferred through the wall to the periphery of the ice cream column 15 and the surface of the ice cream melts slightly to form the lubricating layer and reduce the friction between the column and the wall. A suitable heat conducting metal is utilized for the tube.

While the heat applying apparatus may take various forms, in the present instance it is a water jacket 28 formed by an upper portion of the exterior of the tube wall 17, an outer tubular sleeve 29, parallel to and spaced outwardly from the tube wall, and upper and lower bars 30 and 31 of square cross section secured as by welding to both the sleeve and the tube to form a passageway extending around the upper end portion of the tube. A heating fluid such as hot water is introduced to and withdrawn from the passageway through pipes 32 and fittings 33 secured to an end wall of the sleeve. To force the fluid to flow from one pipe to the other around the passageway, a vertical bar 35 is secured to the sleeve and tube between the pipes to block fluid flow from one pipe to the other along the sleeve end wall.

The effect of treating the tube wall to reduce friction between the wall and the advancing column is illustrated in FIGURES 4 and 5 which are elevational views of different products 10 formed respectively with and without treating the wall. Referring to the FIGURE 4 product, it will be seen that the layers 13 are distorted by a downward curvature of their central portions with respect to their ends along the vertical side edges of the product. This distortion is due to frictional engagement of these side edges with the tube wall 17 during advance of the column 15 along the tube 16. FIGURE 4 represents an actual product formed in apparatus like that disclosed without the water jacket 28 but with a flow rate of 600 gallons of ice cream per hour.

FIGURE 5 represents a product 10 actually formed with the disclosed apparatus using the water jacket 28 with the ice cream flowing at a temperature of 22 degrees Fahrenheit and with water flowing in the jacket at a temperature of 100 degrees Fahrenheit. Not only did this result in reduction of distortion in the product as shown in this figure and formed at the 600 gallons per hour flow rate, but it enabled the rate to be increased to 900 gallons per hour with less distortion than occurred at the 600 gallons per hour rate without treating the walls.

While a preferred embodiment of the invention has been shown in the drawings and described above, it is to be understood that the invention is not intended to be limited by such disclosure. Rather, it is the aim to cover all alternative constructions and modifications falling within the spirit and scope of the invention as expressed in the appended claims.

What is claimed is:

1. In a method of forming an edible product of different materials, the steps of assembling a plurality of sections of said materials into an elongated column with flat layers extending transversely of the column and with adjacent sections of adjacent layers formed of different materials, confining the column within a wall forming a passageway having a cross-sectional size and shape complementing the size and shape of the periphery of the column, applying a pressure behind the column to advance the column along said passageway with the column filling the space within and contacting said wall, and treating the wall to reduce the friction between the wall and the peripheral portion of the column and thereby avoid distortion of the layers due to advance of the central portion of each layer ahead of the peripheral portion in contact with the wall.

2. In a method of forming an edible product of different materials, the steps of assembling a plurality of sections of said materials into an elongated column with flat layers extending transversely of the column and with adjacent sections of adjacent layers formed of different materials, confining the column within a wall forming a passageway having a cross-sectional size and shape complementing the size and shape of the periphery of the column, applying a pressure behind the column to advance the column along said passageway with the column filling the space within and contacting said wall, and introducing a layer of lubricating material between the wall and the peripheral portion of the column and to reduce the frictional drag on the peripheral portion of the column and thereby avoid distortion of the layers due to advance of the central portion of each layer ahead of the peripheral portion.

3. In a method of forming an edible product of different semisolid materials at least one of which tends to become more liquid upon the application of heat, the steps of assembling a plurality of sections of said materials in a semisolid state into an elongated column with flat layers extending transversely of the column and with adjacent sections of adjacent layers formed of different materials, confining the column by a wall forming a passageway having a cross-sectional size and shape complementing the size and shape of the periphery of the column, advancing the column lengthwise along the passageway with the column filling the space between and contacting the wall, and applying heat to the wall to produce a partial melting of said one material around the periphery of said column to form a lubricating layer reducing the friction between the column and the wall and avoiding distortion of the layers due to advance of the central portion of each layer ahead of its peripheral portion.

4. The combination of apparatus for assembling a plurality of sections of different edible materials into an elongated column with flat layers extending transversely of the column and with adjacent sections of adjacent layers formed of different materials, a discharge tube receiving said column from said assembling apparatus and guiding the column for movement lengthwise of the column and into a container, said tube having a wall defining a passageway of a cross-sectional size and shape complementary to the periphery of said column, and means for treating said wall to reduce the friction between the wall and said periphery of the column to avoid distortion of the product due to advance of the central portion of each layer along the tube ahead of the periphery of the column.

5. In apparatus for forming an edible product of different semisolid materials at least one of which tends to become more liquid when subjected to heat, the combination of apparatus for assembling a plurality of sections of said materials in a semisolid state into an elongated column having a pattern of layers extending transversely of the column with contacting sections of adjacent layers formed of different materials, a discharge tube receiving said column during advance of the column from said assembling apparatus and guiding the column for lengthwise movement into a container, said tube having a wall engaging the periphery of the column, and means for heating said wall to produce a partial melting of said periphery of the column to form a lubricating layer reducing the friction between the column and the wall and avoiding distortion of the layers due to advance of the central portion of each layer ahead of its peripheral portion.

6. In apparatus for forming an edible product of different semisolid materials at least one of which tends to become more liquid when subjected to heat, the combination of apparatus for assembling a plurality of sections of said materials in a semisolid state into an elongated column having a pattern of layers extending transversely of the column with contacting sections of adjacent layers formed of different materials, a discharge tube receiving said column during advance of the column from said assembling apparatus and guiding the column for lengthwise movements into a container, said tube having a wall engaging the periphery of the column, and means defining a fluid passageway around a portion of said tube to receive and guide a heating fluid into contact with said walls to heat the wall to produce a partial melting of said periphery the column to form a lubricating layer reducing the friction between the column and the wall and avoiding distortion of the layers due to advance of the central portion of each layer ahead of its peripheral portion.

References Cited

UNITED STATES PATENTS

| | | | |
|---|---|---|---|
| 797,276 | 8/1905 | Glauser | 107—1 |
| 1,281,592 | 10/1918 | Laskey | 107—1 |
| 3,213,808 | 10/1965 | Schafer | 107—54 |

WALTER A. SCHEEL, *Primary Examiner.*

J. SHEA, *Assistant Examiner.*